Figure 1:
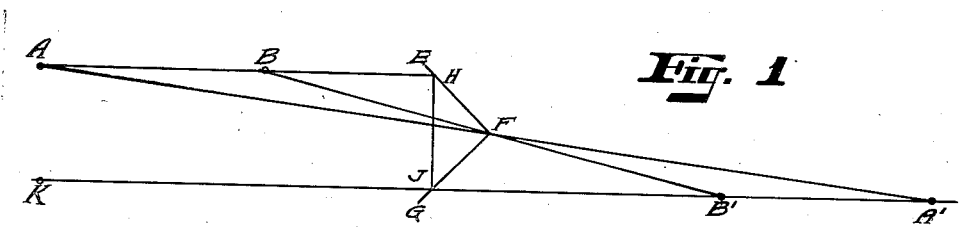

Jan. 29, 1952

E. ROOT, III 2,583,596

OPTICAL SYSTEM FOR PATH-LENGTH MULTIPLICATION IN INTERFEROMETERS

Filed Jan. 6, 1948

4 Sheets-Sheet 1

Inventor
Elihu Root III
by Kenway Jenney Witter & Hildreth
Attorneys

Jan. 29, 1952 E. ROOT, III 2,583,596
OPTICAL SYSTEM FOR PATH-LENGTH MULTIPLICATION
IN INTERFEROMETERS
Filed Jan. 6, 1948 4 Sheets-Sheet 2

Inventor
Elihu Root III
by Kenway Jenney Witter & Hildreth
Attorneys

Jan. 29, 1952　　　　　E. ROOT, III　　　　2,583,596
OPTICAL SYSTEM FOR PATH-LENGTH MULTIPLICATION
IN INTERFEROMETERS
Filed Jan. 6, 1948　　　　　　　　　　　　4 Sheets-Sheet 3
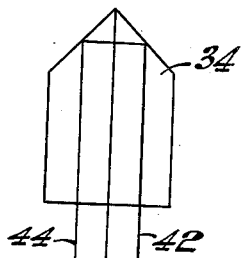
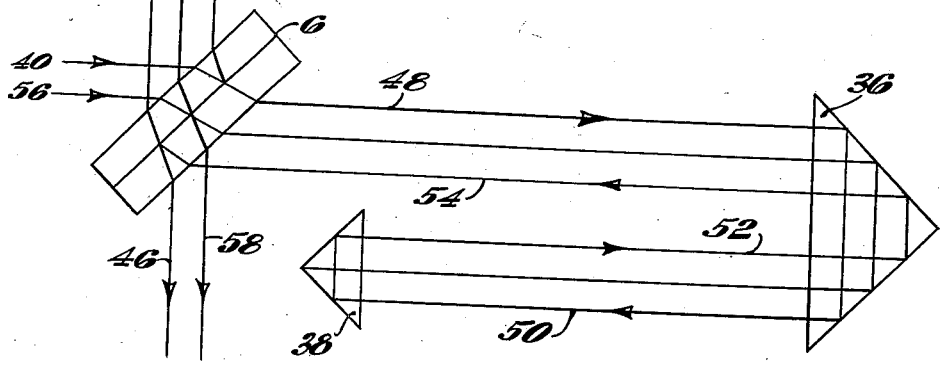
*Fig. 7*
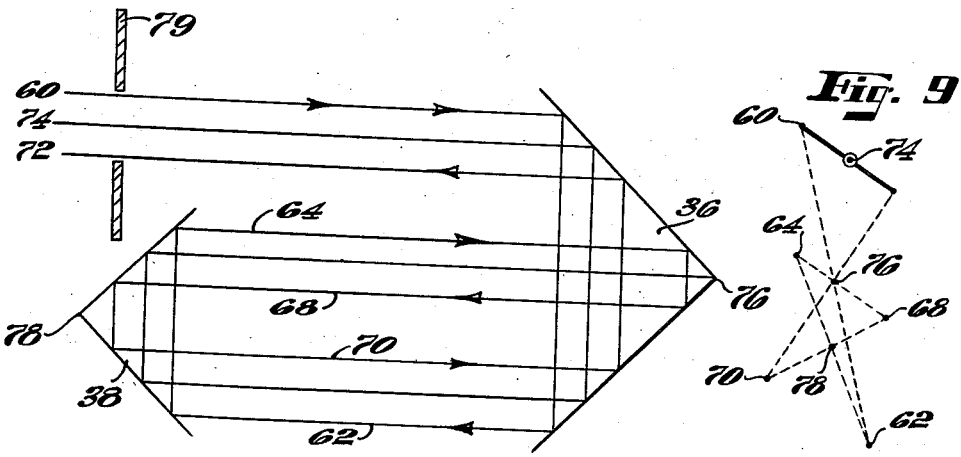
*Fig. 8*　　　*Fig. 9*
Inventor
Elihu Root III
by Kenway Jenney Witter & Hildreth
Attorneys Jan. 29, 1952
E. ROOT, III
2,583,596
OPTICAL SYSTEM FOR PATH-LENGTH MULTIPLICATION
IN INTERFEROMETERS
Filed Jan. 6, 1948
4 Sheets-Sheet 4

Inventor
Elihu Root III
by Kenway Jenney Witter Hildreth
Attorneys

Patented Jan. 29, 1952

2,583,596

UNITED STATES PATENT OFFICE 2,583,596

OPTICAL SYSTEM FOR PATH-LENGTH MULTIPLICATION IN INTERFEROMETERS

Elihu Root, III, Springfield, Vt.

Application January 6, 1948, Serial No. 707

7 Claims. (Cl. 88—14)

The present invention relates to optical devices and more particularly to interferometers. A particular use of the interferometers herein described is in connection with measuring devices of the type described in my copending application Serial No. 768,300 filed August 13, 1947.

My copending application describes the use of an interferometer as a means of effecting extremely accurate measurements. One of the mirrors of the interferometer is connected to a measuring head which is capable of being moved toward and from the work. As the head moves either forward or backward a count of the interference fringes is made and by a special form of counter a net count is indicated. Thus the total net motion of the head is accurately determined in terms of the wavelength of the light source. It is essential that the apparatus itself be capable of handling the high precision. For example, with a plane mirror on the measuring head it is essential to make sure that the mirror always moves parallel to itself. This requires extremely accurate machining and adjusting of the ways and the various parts which enter into the motion of the head.

One object of the present invention is to provide a mirror system whereby slight angular deviation of the measuring head mirror from true parallel motion introduces negligible error. To this end the plane mirror in each arm of the interferometer is replaced by a group of mutually perpendicular reflecting surfaces.

Another object of the present invention is to provide path-multiplication means whereby the range of the instrument described in my copending application may be increased.

A further object of the present invention is to provide path-multiplication means in an interferometer which may be used in combination with the interferometer described in my copending application, to measure long distances without the necessity of taking numerous steps.

Other features of the invention consist of certain novel features of construction, combination and arrangements of parts hereinafter described and particularly described in the claims.

Figure 2:
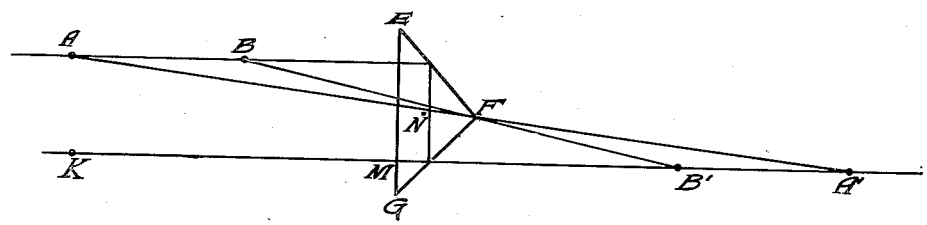
Figure 3:
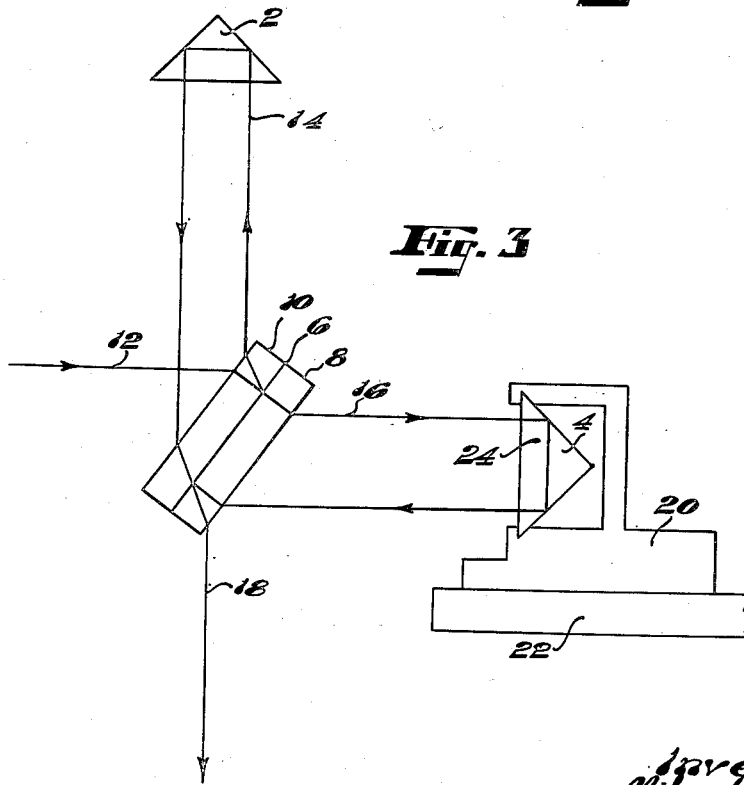
Figure 4:
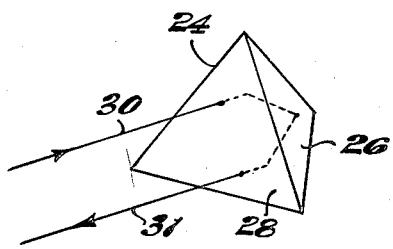
Figure 5:
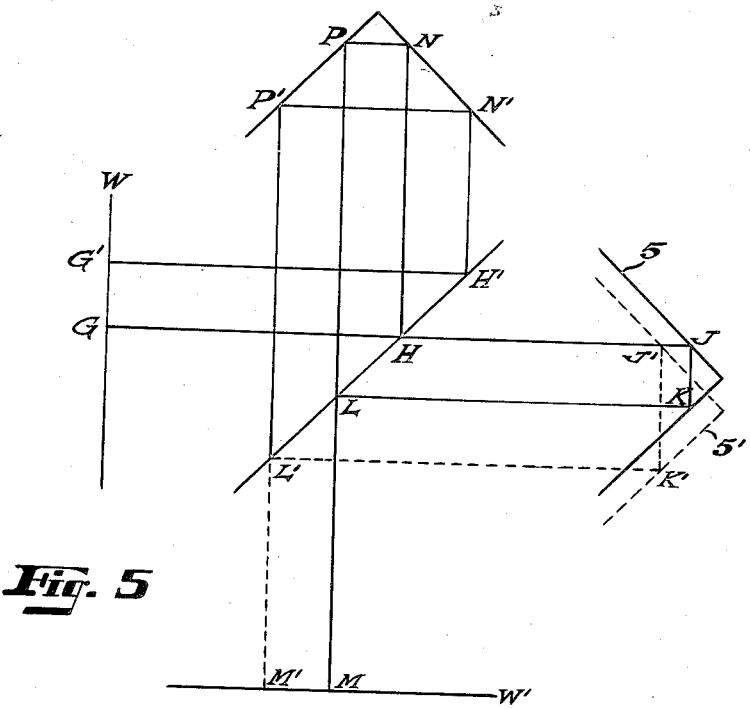
Figure 6:
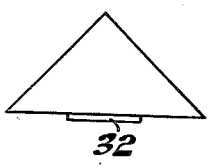
Figure 10:
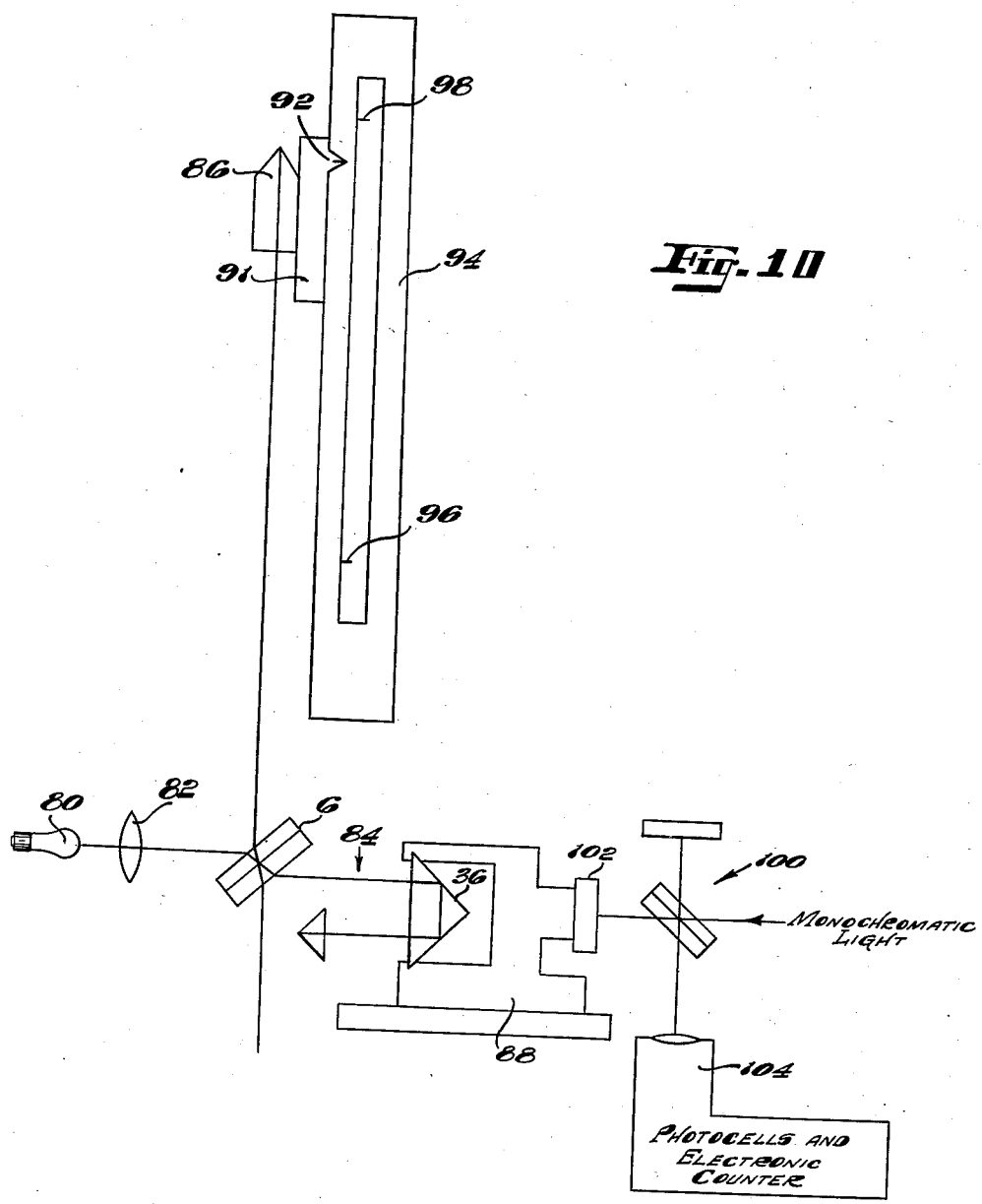

In the accompanying drawings, Figs. 1 and 2 are illustrations of the proportion of certain reflecting surfaces used in the present invention; Fig. 3 is a diagram of an interferometer which permits deviations from parallel motion of its moving elements; Fig. 4 is a diagram of a tetrahedral prism with three mutually perpendicular internal reflecting surfaces; Fig. 5 is a diagram illustrating tolerance to lateral deviation; Fig. 6 shows a modification of one of the prisms in Fig. 3; Fig. 7 is a diagram of an interferometer which provides path-multiplication means and which also permits deviations from parallel motion of its moving elements; Fig. 8 shows a rearrangement of some of the elements in Fig. 7; Fig. 9 is a projection based on Fig. 8; Fig. 10 is a diagram showing an application of the mirror system of Fig. 7 to an interferometer.

Before taking up the specific arrangements which this invention comprises, it will be advantageous to first consider some of the properties of groups of mutually perpendicular reflecting surfaces. It is well known that a ray of light striking in succession three mutually perpendicular plane reflecting surfaces returns parallel to its original direction, regardless of the orientation of the group with respect to the incident beam. A less obvious fact is that the total length of travel of such a beam from a given starting point to a given returning point is also independent of the orientation of the group of reflectors. This can be understood most clearly by examining the virtual images formed by the various reflectors. The effect is illustrated for two dimensions in Fig. 1.

In Fig. 1, EF and FG represent two plane mirrors perpendicular to each other and to the plane of the paper, and having an axis of intersection at F. The remaining points and lines may be considered to lie in the plane of the paper. A and B are two arbitrary points which define a beam that follows the actual path ABHJK. It can be readily shown that this mirror system forms virtual images at A', B', and that a line between object and image intersects and is bisected by axis F. From a consideration of the symmetries of the figure, the total length of ray ABHJK is equal to the length of line A'B'JK. If the mirror system is rotated about axis F the positions A', B' remain unchanged; consequently neither the direction of the ray portion JK nor the total ray length, which is still equivalent to A'B'JK, is altered.

The three dimensional case in which a ray strikes three mutually perpendicular reflectors is extremely difficult to draw clearly. However it will be readily understood by those skilled in the art that a continuation of the above reasoning shows in the three dimensional case that neither total ray length nor direction of the returning ray will be altered by rotation of the group of reflectors about any axis through the point of intersection of the three reflector planes.

In constructing a group of two or three mutually perpendicular reflecting surfaces, it is usually preferable for reasons of precision, stability, and efficiency of reflection to use an internally reflecting prism. The refractive effect of such a prism is shown for two reflections in Fig. 2. The prism 1 with reflecting faces EF and FG, forms a virtual image A', B', likewise such that a line between object and image is bisected by the point F. Hence rotation of the prism about axis F has no effect on the direction of the emergency ray. For interference applications, it is important that not only the total path length should be substantially constant, but the path lengths through air and glass should individually be substantially uniform, regardless of the angular position of the prism. Since the prism is normally used with the face EG substantially perpendicular to the incident and emergent rays, any turning will have a second order effect on the path lengths in air and glass, provided that the angle of turn is kept small. Turning the prism about axis F does deviate the ray MK parallel to itself and laterally. However there will be found some point N, which may be termed the virtual axis, about which the prism may be rotated without initial deviations of the ray MK. A three reflection tetrahedral prism behaves similarly and will be found to have a virtual center. It may be rotated about any axis through the virtual center.

Fig. 3 is a diagram of an interferometer in which each of the customary fully reflecting plane mirrors has been replaced by a prism with two internally reflecting plane surfaces at right angles. The prisms are shown at 2 and 4. The usual half reflecting surface is provided at 6 on a plate 8, and a symmetrical compensating plate is provided at 10. The plate 10 is important in this arrangement not only for use with white light but also for use with nonochromatic light, for by preserving the symmetry of the two interfering beams it allows use of a beam of wider angle than would otherwise be permissible.

A ray of light is shown entering the interferometer at 12. It is split by the half-reflecting surface 6 into two portions 14 and 16 which after reflection by prisms 2 and 4 rejoin in interfering condition at 18. The resultant intensity of portion 18 depends on the position of prism 4 which is shown mounted on a carriage 20. The carriage 20 is adapted to move substantially parallel to itself on ways 22 in a direction parallel to ray 16. The motion of the carriage 20 may thus be measured in terms of the wavelength of light by observing the succession of interference states at 18. Due to inaccuracies in the ways prism 4 may be considered as executing small rotations about a virtual axis 24 as it moves along the ways. A consideration of the preceding discussion of the properties of multiple reflecting surfaces shows that such rotation will cause no substantial change in the total path length between 12 and 18 of that branch of the ray which passes through prism 4. It should be noted that this condition also holds for other rays entering the interferometer and that any ray entering parallel to 12 will have the same path difference in its two branches as does 12.

For some purposes an interferometer with compensation for rotation about one axis as shown in Fig. 3 will be adequate. However if each of the prisms in Fig. 3 is replaced by a tetrahedral prism having three mutually perpendicular internal reflecting surfaces, compensation for rotation about any axis through the virtual center of the prism is effected. A tetrahedral prism is shown three-dimensionally in Fig. 4. The three mutually perpendicular reflecting surfaces are indicated at 24, 26, 28. The path of a ray through the prism is indicated starting at 30 and emerging at 31.

The interferometer of Fig. 3 is also tolerant to lateral displacement of reflector 4. The effect of such displacement is shown in Fig. 5. A wave front of a parallel beam entering the interferometer is shown at W. A wave front of the corresponding emergent parallel beam is shown at W'. For one moment the position of the reflector is represented at 5. A ray following path GHJKLM interferes with a ray following path GHNPLM.

Now suppose that the reflector is displaced laterally from 5 to 5'. The original path GHJKLM is now diverted to the equally long path GHJ'K'L'M', which interferes with a ray following path G'H'N'P'L'M' which is of the same length. Repetition of this procedure for other rays shows that for a straight wavefront, the interference phase is uniform across the wavefront and is unchanged by the shift from 5 to 5'.

The combined tolerance for rotation and lateral translation of the moving reflector means that the interferometer can be built with much less accurate ways and a much shorter carriage than are customarily required. This is of particular importance in cases where it is not convenient to mount the moving reflector on permanently aligned ways.

It will be understood that in Fig. 3 and also in the other subsequently described interferometer arrangements, while two-reflection prisms have been shown for the sake of clearness, three-reflection prisms as shown in Fig. 4 can be substituted in all cases and will usually be preferable. It should also be understood that the prisms may be replaced by groups of first surface mirrors.

The interferometer of Fig. 3 may be used with the measuring system described in my copending application. If this is done, prism 4 may replace the plane mirror attached to the measuring head. The front surface of prism 2 may be modified as shown in Fig. 6 by the application of a projecting transparent layer 32 to part of its surface. The purpose of layer 32 is to obtain two phases by retarding part of the beam a quarter wavelength. The use of these two phases is fully described in my copending application. Layer 32 may be formed by the vacuum evaporation, through a mask, of some substance such as magnesium fluoride. The thickness is chosen so that a ray in traversing the layer once will be retarded ⅛ wavelength behind a ray traveling the same distance in air. Since layer 32 extends equally on both sides of the center of the prism face, any ray which strikes the layer at all passes through it both going and returning and is thus retarded a total of ¼ wavelength.

An interferometer which provides path multiplication means is shown in Fig. 7. Three multiply reflecting prisms are used. These are shown at 34, 36, 38. A ray is shown entering the interferometer at 40. This is split into two branches by half-reflecting surface 6. One branch follows successively the paths 42, 44 and emerges from the interferometer at 46 where it interferes with the second branch which follows successively the paths 48, 50, 52, 54. Another ray entering the interferometer at 56 may be termed the central ray. One branch of the central ray strikes the apex of prism 34 and the other branch strikes the apex of prism 38. Both branches of the central ray may be considered to return along their original courses, emerging at 58. Going and returning portions of any other ray in the interferometer always lie on opposite sides of and equidistant from the corresponding portion of the central ray. It should be noted that prism 34 is provided with sufficient thickness of glass so that the total path length in glass will be equal for both arms of the interferometer.

Prism 38 is fixed in position. For some purposes prism 34 may be mounted on ways which allow it to move parallel to itself in a direction parallel to ray 42. However for the moment prism 34 will be considered fixed. Prism 36 may be mounted on a carriage and ways which allow it to move parallel to itself in a direction parallel to ray 48.

If prism 36 is moved to the right a distance of one wavelength, ray portions 48, 50, 52, 54 will each be increased by a distance of one wavelength. The intensity at 46 will thus undergo four cycles. This is twice the effect which would be obtained by the same motion with a conventional interferometer. Thus the sensitivity multiplication of the interferometer as shown is two.

Other values of multiplication may be obtained. In Fig. 8 the portion of Fig. 7 comprising prisms 36 and 38 is shown modified to obtain a multiplication of three. An incident ray at 60, corresponding to 48 in Fig. 7 follows successively the paths 62, 64, 68, 70, 72. The two prisms are now more nearly of equal size and the central ray 74 strikes the apex 76 of prism 36 rather than the apex 78 of prism 38.

Fig. 9 is a projection on a perpendicular plane of the various correspondingly numbered ray portions of Fig. 8 as they might appear if tetrahedral prisms were to replace the two-reflection prisms shown in Fig. 8. The apexes of the two tetrahedral prisms corresponding respectively to 36 and 38 are shown projected respectively at 76 and 78. The dotted lines which trace out the sequence 60, 62, 64, 68, 70, 72 are not intended to represent the paths of rays within the prisms but are simply to clarify the fact that any ray incident to a prism and its corresponding emergent ray are to be found on a line through the apex of the prism and equidistant from the apex. A series of constructions similar to Fig. 9 but for other rays shows that the projection 74 of the central ray behaves as a virtual apex for the two prisms considered as a group. Thus any initial incident ray 60 and its corresponding final emergent ray 72 will be found on a line with 74 and equidistant from it. The position of 74 for any multiplication value may easily be found by the following rule. If $n$ is the multiplication value, $a$ is the distance between 76 and 78 perpendicular to the direction of traverse of the rays (which may be termed the offset between the two prisms), and $b$ is the distance between 74 and 78, then $b = na$ and 74 is always to be found in line with 76 and 78. Once the central ray has thus been located for a given value of $n$ and a given amount of offset, it is a simple matter to determine a combination of prism sizes and masking of the incident beam, which will insure that all rays entering the system will undergo the prescribed path multiplication. Thus in Fig. 8 a diaphragm 79 serves as a mask to confine the rays to those parts of the prisms that will give the same path-multiplication factor for all rays.

The path-multiplication means in an interferometer of the type shown in Fig. 7 have certain particular advantages over other possible multiplication means in which the multiple path is obtained by reflection back and forth at a slightly oblique angle between two parallel single reflectors. These advantages are: (1) All the ray portions subject to change in length are parallel to each other and to the direction of motion of the moving prism. (2) The compensation for rotation of the moving prism discussed in connection with Fig. 3 is retained and this becomes increasingly important as the degree of multiplication increases. (3) The high efficiency of the internal reflecting prisms which may be used permits a high degree of multiplication without a prohibitive loss of light.

If, for the purpose of increasing sensitivity the interferometer shown in Fig. 7 is to replace the interferometer of the measuring device described in my copending application, prism 36 replaces the measuring head mirror and prism 34 is modified in the manner discussed in connection with Fig. 7.

A system in which the path multiplier of Fig. 7 is used is illustrated by the interferometer measuring equipment of Fig. 10. That system comprises a polychromatic light source, preferably of white light, indicated at 80, a collimating lens 82, the half-reflecting surface 6 and a mirror system designated generally at 84 and consisting of one of the path-multiplying systems heretofore described. One branch of the ray goes through the system 84, while the other is directed to a prismatic double reflecting mirror 86. The length of the path through glass in the prismatic mirror 86 should be identical with the total length of path through glass in the entire mirror system 84. The mirror system 84 is shown arranged for a multiplication of two, but in practice a larger number would be used. The prism 36 is mounted on a carriage 88 which moves in suitable ways 90. The mirror 86 is mounted on a carriage 91 which has an index 92.

An example of the use of the equipment in Fig. 10 is to measure the distance on a bar 94 between the marks 96 and 98. The index 92 is set adjacent to one mark, say the lower mark 96. The carriage 88 is then adjusted until the interference effects produce a dark or light field. Since the source 80 is polychromatic this means that the total distance from surface 6 to the prismatic mirror 86 and back again is the same as the total length of paths from 6 through all portions of the system 84 and back again. The carriage 91 is moved until the index 92 is opposite the mark 98. The carriage 88 is then moved to the right until the total path lengths are again equal, as shown by a completely dark (or light) field. It has, however, been necessary to step the carriage 88 along only by the factor $1/n$ where $n$ is the multiplication factor of the optical system 84.

The actual motion of the carriage 88 itself is preferably measured by another interferometer 100, namely, one of the type shown in my copending application. To this end the carriage 88 is provided with a mirror 102 which is here shown as a plane mirror although it may be one of the prismatic or multiple-reflection types herein illustrated. The second interferometric system has photocell and counting apparatus illustrated diagrammatically at 104, operated exactly in accordance with the disclosure of my prior application. The counter records the net count of interference fringes in the passage of the carriage 88 from one position to the other. The total net count then gives an accurate measure of the distance between points 96 and 98.

By the arrangement shown in Fig. 10, the measurement of a relatively long piece is effected within a relatively short range. Hence, if the interferometer 100 has a range of, say 4 inches, and the multiplication factor is 10, it is possible to make a measurement of 40 inches in a single step. It will be understood that the sensitivity decreases in the ratio $1/n$, that is, the precision of the measurement of the part 94 would be smaller than the precision attainable with the measuring system 100 when used alone, by the factor $1/n$. However, since measurements may be made to a fractional wavelength by the system 100, the measurement of the part 94 is sufficiently accurate for most purposes, even with a relatively high multiplication factor.

Having thus described the invention, I claim:

1. In an interferometer including means to divide an incident beam into two branches, the combination of reflecting devices for the separate branches, at least one of said reflecting devices comprising a prism having at least two mutually perpendicular internal reflecting surfaces, said prism having a transparent projecting layer symmetrically disposed on a part of the surface exposed to the incident light, the thickness of said layer being a fraction of a wavelength of light whereby a ray traversing said layer is retarded in phase with respect to a ray striking another part of the prism.

2. An optical system for path-length multiplication in a bundle of parallel light rays comprising two opposed reflecting devices, each including mutually perpendicular plane reflecting surfaces, the apexes of the two reflecting devices being offset by a distance $a$ perpendicular to the direction of traverse of the rays, and the point of impingement of the central ray of the bundle being displaced from one apex by the distance $b$, where $b=na$, and $n$ is the desired path-length multiplication factor.

3. An optical system for path-length multiplication in a bundle of parallel light rays comprising two opposed prisms each having three mutually perpendicular plane reflecting surfaces, the apexes of said prisms being offset by a distance $a$ perpendicular to the direction of traverse of the rays, the point of impingement of the central ray of the bundle on one prism being displaced from the apex of the other prism by the amount $b$, where $b=na$, and $n$ is the desired path-multiplication factor, and masking means for confining the rays directed upon the system to paths having said multiplication factor.

4. In an interferometer having means to divide an incident beam into two branches, a reflecting system for one of the branches comprising two reflecting devices, one of which is movable in translation toward and away from the other, each reflecting device having at least two mutually perpendicular plane reflecting surfaces, said reflecting devices being relatively positioned to cause an incident beam to undergo several parallel traversals between the devices before final emergence and to render the direction of the emergent beam substantially independent of rotation of either of said devices.

5. In an interferometer having means to divide an incident beam into two branches, a reflecting system for one of the branches according to claim 4, in which each reflecting device comprises a prism having at least two mutually perpendicular internal reflecting surfaces, the faces of the prisms being susbtantially normal to the direction of the traversals of said beam.

6. An optical system for path-length multiplication in a bundle of parallel light rays comprising two opposed reflecting devices, each including mutually perpendicular reflecting surfaces, each reflecting device having at least two mutually perpendicular plane reflecting surfaces, whereby an incident beam undergoes several parallel traversals between the devices before final emergence, the apexes of the two devices being relatively offset in a direction perpendicular to the traverse direction, and the point of impingement of the central ray of the bundle on one device being displaced from the apex of one device by an integral number of times the amount of said offset.

7. Measuring apparatus comprising an interferometer including means to divide an incident beam of parallel rays into two branches, a movable reflecting device for one branch, a path-length multiplying reflecting device for the other branch including opposed devices having mutually perpendicular reflecting surfaces, one of said devices being stationary and the other movable, the motion of the movable device being accurately submultiple to the motion of movable device of the first branch, and a second interferometer for measuring the movement of said movable device, said second interferometer including as one fully reflecting plane mirror thereof a plane reflecting surface integral with the movable reflecting device.

ELIHU ROOT III.

REFERENCES CITED

The following references are of record in the file of this patent:

FOREIGN PATENTS

| Number | Country | Date |
|---|---|---|
| 499,186 | Germany | June 3, 1930 |
| 555,672 | Great Britain | Sept. 2, 1943 |
| 595,940 | Great Britain | Dec. 23, 1947 |

OTHER REFERENCES

Article by Twyman in Transactions of the Optical Society, volume XXIV, 1922–1923, pages 189 and 199.

Journal of the Optical Society of America, volume 26, 1936, pages 264 and 265. (Article by Hoyt).